United States Patent [19]

Tetzlaff

[11] 4,066,907

[45] Jan. 3, 1978

[54] GAMMA IRRADIATION PLANT

[76] Inventor: Karl-Heinz Tetzlaff, No. 3, Morikestrasse, 6233 Kelkheim, Germany

[21] Appl. No.: 649,601

[22] Filed: Jan. 15, 1976

[30] Foreign Application Priority Data

Jan. 15, 1975 Germany ............................ 2501381

[51] Int. Cl.[2] ............................................ G01M 21/00

[52] U.S. Cl. .................................................... 250/453

[58] Field of Search ................ 250/453, 454, 456, 515

[56] References Cited

U.S. PATENT DOCUMENTS

| | | | |
|---|---|---|---|
| 2,925,496 | 2/1960 | Zoubek | 250/453 |
| 3,417,239 | 12/1968 | Blache-Fraser et al. | 250/453 |
| 3,506,825 | 4/1970 | Hartmann | 250/453 |
| 3,641,342 | 2/1972 | Armel et al. | 250/453 |
| 3,664,188 | 2/1972 | Kockott | 250/453 |
| 3,673,409 | 6/1972 | Green | 250/453 |

*Primary Examiner*—Alfred E. Smith

*Assistant Examiner*—B. Anderson

*Attorney, Agent, or Firm*—John C. Smith, Jr.

[57] ABSTRACT

A gamma irradiation plant for the irradiation of objects or materials comprises irradiation equipment, buildings and storage facilities. The objects or materials are irradiated on tiered columnar racks, besides being stored on racks before and after the irradiation treatment, transported to and from the racks as well as transferred from tier to tier by one or more goods handling appliances. The tiered columnar racks are arranged to rotate about their own vertical axes while being carried by a rotating carrier in a circular path around a radiation source in the middle. One or more shielding elements are attached to the rotating carrier in a position offset from the path of the rays emitted by the radiation source and from the axis of rotation of the tiered columnar racks, said shielding elements being so contrived that attenuation by them of the rays becomes greater with increasing distance from the path of the rays.

7 Claims, 3 Drawing Figures

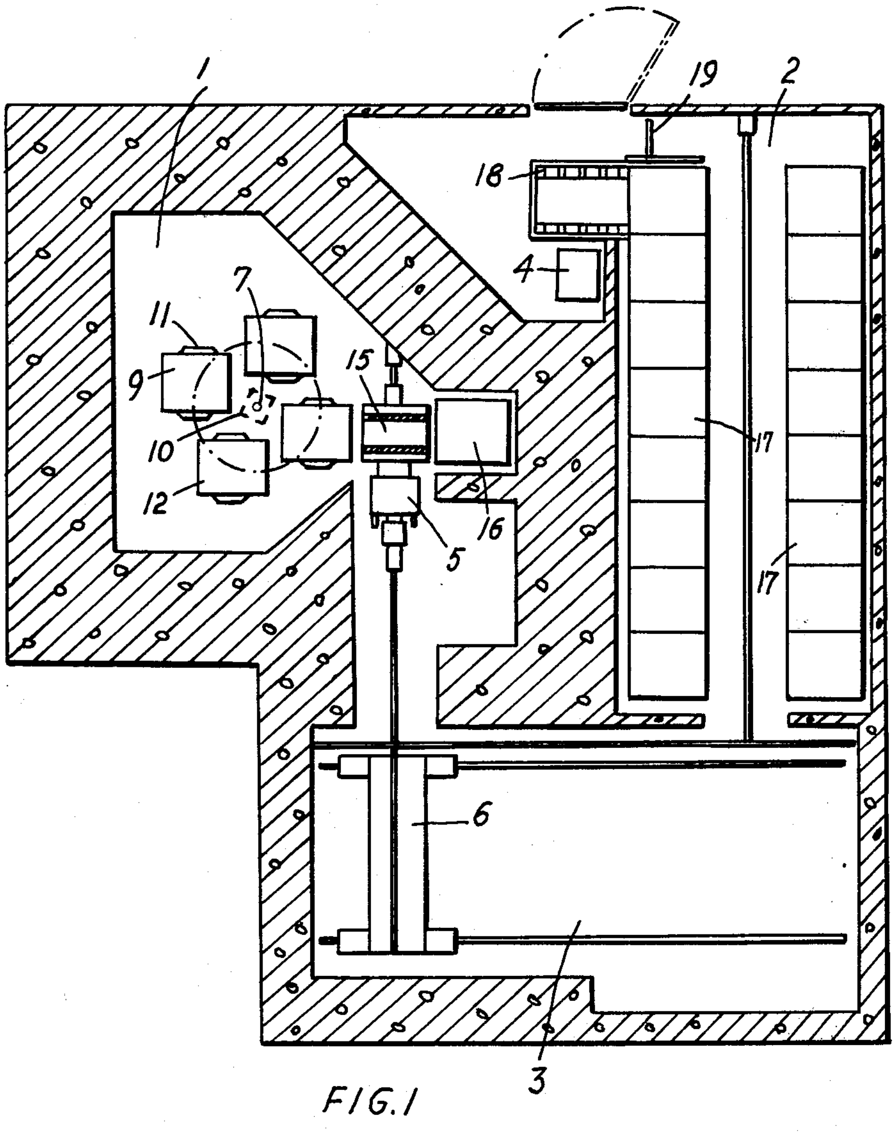
F/G.1

FIG.3
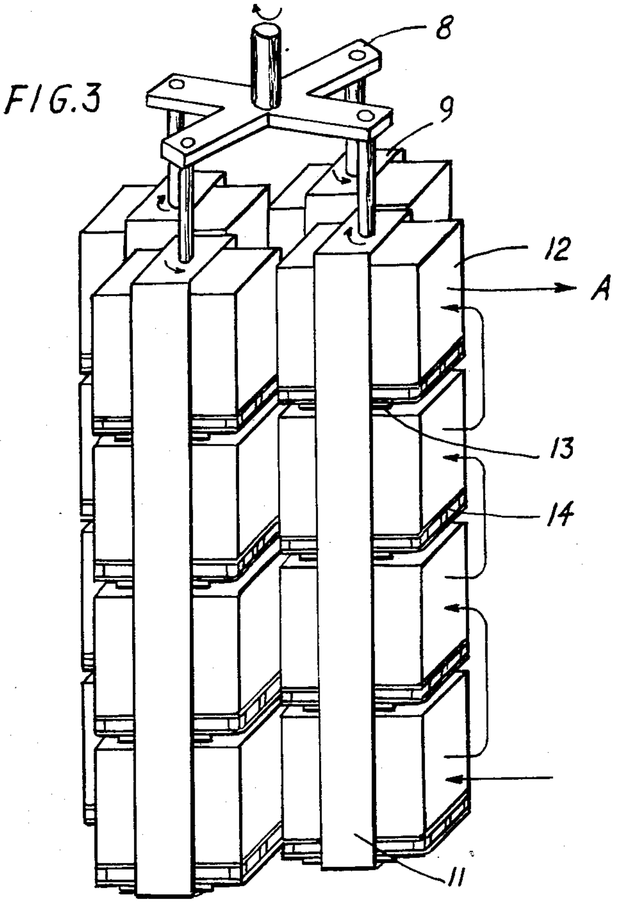
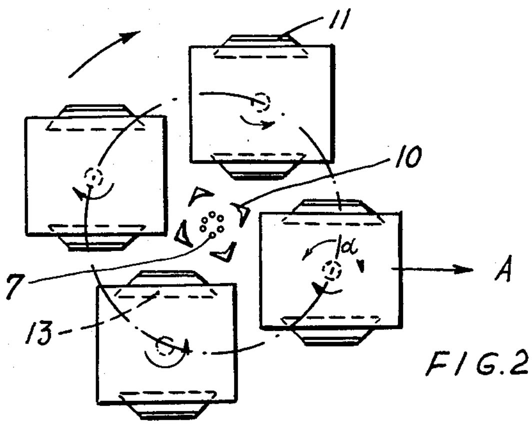
FIG.2

GAMMA IRRADIATION PLANT

BACKGROUND OF THE INVENTION

This invention relates to gamma irradiation plant for irradiating objects or materials for the purpose of changing their biological, physical or chemical properties. Conventional gamma irradiation plant comprises irradiation equipment, shields and storage rooms, as well as equipment used for and in connection with handling and storage. Such plant is preferentially used for the sterilization of medical articles, animal feed and food for human consumption.

If, as is the case in the great majority of such installations, cobalt-60 is used as the radiation source, the gamma irradiation equipment should satisfy the following requirements:

a. It should be capable of reliable automatic operation.

b. The utilization of the available radiation should be good.

c. Irradiation should be as uniform as possible.

d. Personnel requirements should be a minimum.

e. The conditions of irradiation should be flexible.

f. The prime cost (total investment cost for the entire plant) should be low.

g. The necessary floor space should be a minimum.

With a view to satisfying these several demands gamma irradiation plant has already been proposed in which the radiation equipment comprises a plate-shaped radiation source across which the packaged goods, packed for instance in cardboard boxes, can be repeatedly traversed in several straight line paths. Outside the irradiation chamber the goods are transferred to or picked up by live roller beds. The size of the irradiated unit depends principally upon the average packing density and upon the required overdose factor, due allowance being made for an acceptable utilization of the available radiation. The overdose factor is the ratio of the greatest to the smallest radiation dose within any one irradiated unit, for instance inside a cardboard box.

In gamma irradiation plant for sterilizing medical supplies in the case of which the packing density is for example 0.2g/cc, the following are typical wording data: Irradiation unit (size of cardboard box) about 0.1 cub.m. (0.45 × 0.5 × 0.45 m), overdose factor about 1.3, and radiation utilization between 27% and 34%. Even for handling medium throughputs in the order of 1 cub.m. per hour automatic weekend operation requires several hundred meters of live roller beds and associated feeders. This equipment must be available for both the goods that have already been treated and those awaiting irradiation. Nevertheless such gamma irradiation installations are very labor intensive because the goods before and after irradiation must be manually placed on and later removed from the roller beds, consignments for different addresses must be sorted out, assembled and, for the purpose of economical further handling, they must often be stacked and secured on pallets. Empty pallets must also be handled and intermediately stored. In such gamma irradiation plants the cost of labor and staff may well exceed the cost attributable to the radioactive radiation source. Also a large storage room with assembled handling units (pallets) must be continuously made available for despatch and reception. The expenditure in means for two complete goods handling systems (one inside the irradiation chamber and one in the store) and the necessarily large floor space occupied by the store which may vary from a few hundred to several thousand square meters usually also exceed the outlay attributable to the radiation source.

SUMMARY OF THE INVENTION

It is therefore an object of the present invention to provide gamma irradiation plant allotted a more economical technique for storing the goods by appropriately choosing the storage and irradiation equipment to ensure their close operative integration. Another object of the invention is to provide the gamma irradiation plant with an irradiation source that will permit goods and material to be uniformly irradiated in large units resting on standard pallets.

According to the invention in gamma irradiation equipment of the contemplated kind these objects are achieved by irradiating the objects or materials on tiered columnar racks, apart from storing them on racks before and after the irradiation treatment, transporting them to and from the racks as well as transferring them from tier to tier by one or more goods handling appliances, the tiered columnar racks rotating about their own vertical axes while being carried by a rotating carrier in a circular path around a radiation source in the middle, and one or more shielding elements being attached to the rotary carrier in a position offset from the path of the rays emitted by the source and from the axis of rotation of the tiered columnar racks, and being so contrived that attenuation by them of the rays becomes greater with increasing distance from the path of the rays.

The individual tiered columnar racks which are arranged to rotate about their own axes in contrary directions to provide a better utilization of the radiation, carry the irradiated goods or material in individual units which are moved upwards through the columnar rack from the bottom to the top or conversely downwards in the course of a complete irradiation cycle. Technically this may be accomplished in a simple way by stopping the rotation of the rotary carrier in a appropriate position and in then transferring each unit to the next tier above by means of a goods handling appliance, the irradiation of the uppermost unit having been completed and this unit being removed to allow a fresh unit to be simultaneously introduced into the bottom tier. In order to reduce the number of motions the handling appliance must perform the fresh not yet irradiated unit and the fully irradiated unit may conveniently be temporarily deposited on a supplementary rack provided in the immediate vicinity.

The employment of modern goods handling appliances which are capable of extending their forks telescopically from opposite sides would suggest most conveniently locating the supplementary rack so that it is opposite the position in which the rotating racks are stopped. In a particularly economical arrangement the goods handling appliance which transfers the units of goods from tier to tier may also be arranged to perform all the other goods handling tasks that arise. Since the storage racks are erected in rooms less exposed to the radiation risk the rail mounted goods handling appliance may be rendered suitable for carrying out the conveying operations between the irradiation chamber and the storage chamber by the provision either of traversing equipment or of curves in the rail track. Since the plant is fully automatic the storage chamber need not be shielded to a greater extent than may be necessary to protect the actual equipment from damage. For the automatic control of all handling operations it is desirable to provide a computer.

On the side of the path of the rays from the radiation source and offset from the axis of rotation of each tiered columnar rack shielding elements are provided which do not interfere with the radiation in the immediate neighborhood of the axis of rotation, but which increasingly shield the more peripheral regions of the irradiated goods. From the point of view of satisfactorily utilizing the radiation and of reducing the overdose factor a cylindrical shape of a unit of irradiation material would be very favorable, but very good results can still be obtained with cubic and oblong unit shapes which are preferable for practical reasons. The utilization of the available radiation can also be improved by so disposing the irradiated goods, for instance canned goods, that a cavity remains around the axis of rotation in its immediate vicinity. In the case of irradiation units having a rectangular base the overdose factor can be reduced by the provision of supplementary shielding on the columnar racks facing the longer sides of the units.

When the goods in the course of their irradiation on the columnar racks are to be transferred to differnt tiers the rotating carrier which supports the racks is stopped. In order to keep the overdose factor low when this occurs, it is best for example in the case of four columnar racks, to stop the irradiation equipment in a position in which the angle between the direction in which the irradiated units are withdrawn from the side of the rack and the direction of the axis of rotation of the rack from the radiation source is 157.5°.

The advantages which the invention provides reside firstly in that the number of technically intricate and expensive components is greatly reduced, and that handling units conventionally used in the art, principally standard pallets of 1 to 3 cub. meters capacity and loaded weighing about 1 ton can be uniformly irradiated without the packing itself having to be touched. The irradiation of 1 cub.m. units is as uniform as could hitherto be achieved in case of about 0.04 cub. meter capacity units (assuming like packing densities). These advantages are secured in the proposed irradiation plant without any significant reduction in utilization of the radiation. By taking advantage of the up-to-date high storage rack system the required storage space can be very considerably reduced. At the same time the proposed gamma-irradiation plant leads to a very significant saving in personnel.

According to the number of tiered columnar racks that are employed, four or more different types of goods or material requiring different radiation doses can be simultaneously treated. Even units of different sizes can be irradiated. Yet another advantage is that the entire system contains few moving parts that are permanently exposed to the high intensity radiation field.

BRIEF DESCRIPTION OF THE DRAWINGS

For a better understanding of the principle that underlies the invention a preferred embodiment thereof will now be described in greater detail, purely by way of example, with reference to the accompanying drawings, in which:

FIG. 1 is the general layout of a cobalt-60 gamma irradiation plant according to the invention;

FIG. 2 is a cross section of the rotating columnar irradiation racks, and

FIG. 3 is a perspective view of the rotating racks.

DESCRIPTION OF THE PREFERRED EMBODIMENT

Referring to FIG. 1 a gamma irradiation plant according to the invention substantially comprises a well shielded irradiation chamber 1 which contains the irradiation equipment, a storage chamber 2, a labyrinth 3 (communicating passageway), a computer 4 (controller), and a goods handling appliance 5 which can be transferred by traversing means 6 from the storage chamber 2 into the irradiation chamber 1 and back again. The goods handling appliance 5 as well as the traversing means 6 are conventional pieces of high lift racking equipment as generally used for handling goods in stores equipped with high racks. Since irradiation and handling are both entirely automatic the storage chamber 2 need not be completely shielded from the radiation. A radiation-proof door 19 at the entry of the storage chamber 2 is therefore sufficient.

The irradiation chamber 1 contains a rod-shaped radiation source 7, preferably consisting of a plurality of individual rods forming a kind of cage. Mounted above the radiation source 7 is a rotary carrier 8 from which four tiered columnar racks 9 are suspended. These may be coupled by meshing gearwheels which cause them to be rotated in contrary directions. Rotation may be imparted to the rotary carrier 8 and to the columnar racks 9 by a single motor working through transmission means having appropriate ratios. The radiation source 7 is attached to a steel rope which stretches axially down the center of the assembly of racks. A winch permits the radiation source 7 to be lowered on the rope into a tank filled with water.

Shielding elements 10 are attached to the rotary carrier 8. The shielding elements are disposed alongside the radiation source 7 in positions offset from the axis of rotation of the columnar racks 9 and are substantially of the same height as the columnar racks 9. The cross section of the shielding elements 10 is so chosen that their attenuating effect is greater with increasing distance from the path of the rays. At least one shielding element 10 is associated with each columnar rack 9. In the drawing two shielding elements 10 placed to include a right angle are paired for stability reasons. The effect of these shielding elements 10 is to make the radiation dose more uniform across a given cross section of irradiated material. In other words, the overdose factor is reduced. Irradiated goods on a base which is not fully circular cannot be entirely evenly irradiated in this way but the overdose factor is already very acceptable in the majority of applications. Moreover, for polygonal oblong bases a further improvement can be achieved by providing additional shielding elements 11 facing the longer sides of the irradiated material. preferably these latter shielding elements 11 may also be load bearing members which carry the columnar rack 9. The irradiated material is packed in individual irradiation units 12 which rest on supports 13. If the irradiated material is not sufficiently rigid to support itself it will be stacked on a wooden tray or a pallet 14.

For an efficient utilization of the radiation and for maintaining a satisfactory overdose factor the units 12 of irradiated material are arranged to move through the columnar racks 9 from the bottom upwards to the top. The arrows in FIG. 3 are intended to indicate this. However, the sequence is entirely arbitrary, provided measures are taken to ensure that each irradiation unit 12 occupies each level in a columnar rack for the same length of time. This transferring operation of the irradiated material is most conveniently done by stopping the rotary carrier 8 and the columnar racks 9 in a suitable position and then transferring the units by means of the goods handling appliance 5. This goods handling appliance 5 comprises a movable fork or a telescopic table 15 comprising forks which are telescopically extendable from both sides for picking up the units of material. It is thus capable of withdrawing a unit in conventional manner from any tier and of redepositing it in a tier at another level. This goods handling appliance 5 is railbound at the top and at the bottom and it can move onto the traversing means 6 for cross-over to the storage chamber 2. The goods handling appliance 5 thus performs a major part of the work of handling the material in the irradiation chamber 1 as well as its transportation from and to the storage chamber 2 and the necessary handling in the storage chamber. Generally speaking the time involved in handling the material in the irradiation chamber 1 is relatively short so that the normal operating cycles leave sufficient time for the required work to be done in the storage chamber 2.

If the throughput of material for irradiation is very high and the provision of a single handling appliance 5 is insufficient, a second more specialized handling appliance may be provided for the particular task of performing the work of transferring the units from tier to tier in the columnar irradiation racks. Such an appliance might be equipped with a suitable number of forks to transfer all the irradiated units of material in one columnar rack to the next higher tier.

However, under normal circumstances a single goods handling appliance 5 fitted with a telescopic table 15 will prove sufficient. In order to minimize the number of operations the goods handling appliance 5 is required to perform it may be desirable to provide, in proximity with the transferring station, a supplementary fixed rack 16 containing at least two locations in which one irradiated and one fresh unit of material can be temporarily deposited.

If in a large throughput plant the transferring times and the revolution times of the rotary carrier 8 are of the same order of magnitude, then a particular stopping position of the rotary carrier for transferring is preferred in order to avoid adverse effects on the overdose factor. For irradiation equipment comprising four columnar racks this preferential stopping position will be that in which the angle $\alpha$ between the direction A in which the irradiation units are withdrawn from the side of the rack and the direction of the axis of rotation of that rack from the radiation source is 157.5°. In the storage chamber 2 racks 17 comprising several tiers of shelving are disposed on either side of the central aisle. If necessary several aisles may be provided in parallel each with associated racks. An automatic gamma irradiation plant of such a kind will function particularly economically if all operations are controlled by a computer 4 and if the computer 4 and its associated accessory equipment can provide information on the progress of the irradiation treatment at any time. The only manual work that still has to be done in the proposed gamma irradiation plant is that of transferring the incoming units 12 from say a lorry by a fork lift truck to a roller bed conveyor 18 or to a receiving table in the rack storage section whence identification data are transmitted to the computer, the irradiated units being later removed in analogous manner. The work will be greatly facilitated if the units 12 of irradiation material need not be despatched in the order in which they were irradiated, but in some other more desirable order. Example:

A cobalt-60 gamma irradiation plant according to the invention is required to irradiate 1.2 cub.meters of material per hour. This material consists of plastics parts and is stacked 1 meter high on 1.2 × 1 × 0.13 meter pallets. The average packing density of this unit is 0.2 g/cc. A convoy of lorries delivers 24 pallets per day. The identifying data relating to origin and nature of the material for irradiation are injected into the computer input from a typewriting keyboard. The pallets are deposited by fork lift truck on the roller bed conveyor 18 or on a corresponding receiving table. From here the goods handling appliance 5 associated with the racks takes up the pallets on its telescopic table 15, provisionally storing them in the storage racks 17. They are then automatically irradiated according to a priority programme and returned to the storage racks 17 where they remain until a signal received from the computer 4 causes them to be placed back on the roller bed conveyor 18 and to be picked up by the fork lift truck and loaded on a waiting lorry.

The irradiation equipment comprises four columnar racks suspended from the rotary carrier at a radial distance of 104 cms from the axis of rotation. Each rack contains five irradiation units vertically spaced at a center to center distance of 1.24 m. The radiation source in the middle has an overall length of 3.2 meters. The overdose factor is about 1.15 for a radiation utilization of about 30% (as is conventional this refers to the utilizable radiation for the minimum dose). This percentage utilization can be improved to about 35% by making the best possible use of the unit dimensions and by reducing the radius. Moreover, the overdose factor can be reduced to less than 1.10 by additional shielding elements 11. By virtue of the compact up-to-date storage facility (FIG. 1 is drawn on a scale of 1 : 100) a storage covering about 60 sq.m. of floor space and having a height of about 10 meters (racks 7 tiers high) are sufficient to permit completely unsupervised operation to continue for more than 4 days.

The difference from a conventional gamma irradiation plant using roller bed conveyors for 3 days' operation (weekend) will be apparent from the following comparison, assuming materials for irradiation are packed at an average density of 0.2 g/cc.

| | State of the art | Example acc. to invention |
|---|---|---|
| Size of unit of irradiation material | 0.1 $m^3$ | 1.2 $m^3$ |
| Overdose factor | 1.3 | 1.15 |
| Radiation utilization | 30 % | 30 % |
| Length of roller bed conveyor/rack length | 700 m | 20 m |
| Size of storage and despatch facility | 600 $m^2$ | 60 $m^2$ |
| Number of working hours required per day | 10 to 20 | 1 to 2 |

The invention may be embodied in other specific forms without departing from the spirit or essential characteristics thereof. The embodiment is therefore to be considered in all respects as illustrative and not restrictive.

What is claimed is:

1. A gamma irradiation plant for irradiating goods, comprising:

a. a carrier mounted for rotation about a central axially positioned source of radiation;

b. a plurality of support means mounted on said carrier for rotation about separate satellite axes spaced from each other and spaced radially about said central axis, said satellite axes being substantially parallel to said central axis;

c. at least two support shelves mounted on each of said support means for supporting said goods;

d. a plurality of shielding means, each mounted on said carrier along a radius extending from said central axis through the space between said support shelves mounted on adjacent of said support means, said shielding means being adapted to attenuate the radiation from said source, the attenuating effect being greater with increasing distance from said radiation source;

e. whereby as said carrier is rotated about said central axis the goods supported on said support shelves are rotated about said satellite axes while revolving about said radiation source and said shielding means serve to make the radiation dose more uniform across a given cross-sectional area of said goods; and f. a housing means for said carrier, said housing means including article storage means remote from said carrier and article handling means adapted to transfer goods between said storage means and said support shelves and between said support shelves to load and unload goods.

2. A gamma irradiation plant according to claim 1 wherein a plurality of said support shelves are mounted in spaced stacked relationship along the satellite axis of each of said support means.

3. A gamma irradiation plant as defined in claim 2 wherein each of said support shelves has a polygonal oblong configuration, said plant further comprising shielding elements located along the longer sides of said support shelves to assure more uniform irradiation of said goods.

4. A gamma irradiation plant according to claim 1 wherein each of said shielding means comprises a pair of parallel shielding elements extending substantially parallel to said axes with their surfaces confronting said central axis being at right angles to each other.

5. A gamma irradiation plant according to claim 1 further comprising means for automatically controlling said carrier and said article handling means to control transfer of said goods between said carrier and storage means and between said support shelves.

6. A gamma irradiation plant according to claim 1 wherein alternate of said support means are adapted to rotate in opposite directions about their respective satellite axes as said carrier rotates about said central axis.

7. A gamma irradiation plant as defined in claim 1 wherein said article handling means comprises intermediate traversing means movable along a path between at least two spaced positions and support means movable from one of said positions to a position adjacent said carrier and between the other of said positions and said article storage means for transferring goods between said storage means and said support shelves.

* * * * *